No. 12,083. REISSUED FEB. 17, 1903.

E. TYDEN.

PEDESTAL EXTENSION TABLE LOCK.

APPLICATION FILED DEC. 17, 1902.

2 SHEETS—SHEET 1.

Witnesses:
Watson Hurlburt
Fred G. Fischer

Inventor:
Emil Tyden
By Burton & Burton Attys.

No. 12,083. REISSUED FEB. 17, 1903.

E. TYDEN.

PEDESTAL EXTENSION TABLE LOCK.

APPLICATION FILED DEC. 17, 1902.

2 SHEETS—SHEET 2.

Witnesses:
Walton Hurlburt.
Fred G. Fischer

Inventor:
Emil Tyden
By Burton & Burton
his Atty's

UNITED STATES PATENT OFFICE.

EMIL TYDEN, OF HASTINGS, MICHIGAN.

PEDESTAL-EXTENSION-TABLE LOCK.

SPECIFICATION forming part of Reissued Letters Patent No. 12,083, dated February 17, 1903.

Original No. 707,186, dated August 19, 1902. Application for reissue filed December 17, 1902. Serial No. 135,510.

*To all whom it may concern:*

Be it known that I, EMIL TYDEN, a citizen of the United States, residing at Hastings, in the county of Barry and State of Michigan, have invented new and useful Improvements in Pedestal-Extension-Table Locks, of which the following is a specification, reference being had to the accompanying drawings, forming a part thereof.

The purpose of this invention is to provide means for locking securely together the parts of a pedestal extension-table to prevent the sagging apart of the pedestal parts, which is liable to occur at the bottom in the absence of any suitable means for securing them effectively together. The invention consists in a vertical reciprocating element operating at the position where there is commonly mounted a center leg to be inclosed by the pedestal parts when the table is closed up, such a reciprocating element having at a substantial distance below the table-top links pivoted to it extending outward toward the pedestal parts, respectively, the latter having means for engaging these links, so that when the reciprocating element is moved endwise after such engagement the engaged ends of the links are compelled to move horizontally only, and this may be caused to draw the pedestal parts together if the device on each pedestal part is engaged by the link whose horizontal movement is toward the opposite pedestal part.

It consists also in means for giving the necessary endwise movement of the reciprocating element and for locking it against reacting, except as operated for that purpose.

It consists also in specific construction set out in the claims.

Figure 1:
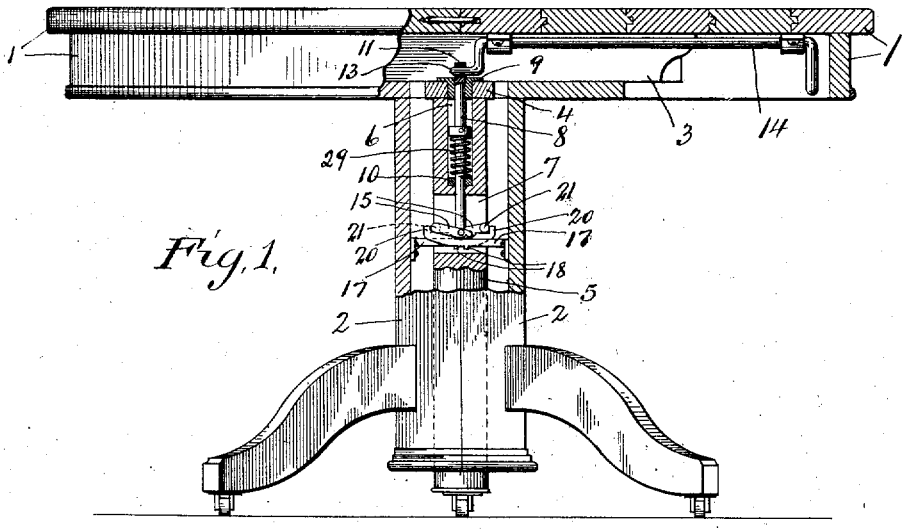
Figure 2:
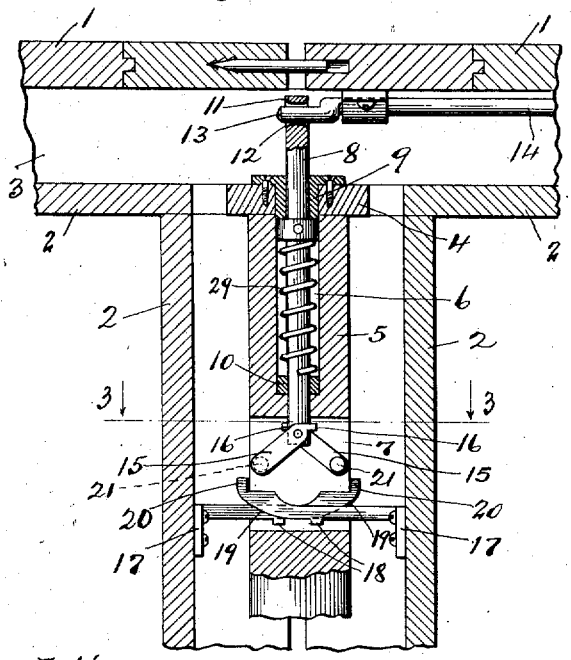
Figure 4:
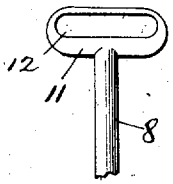
Figure 3:
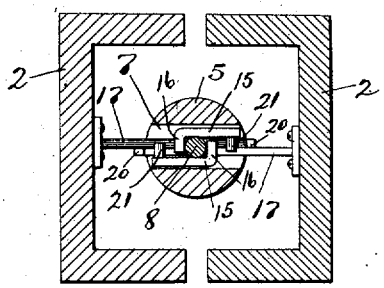
Figure 5:
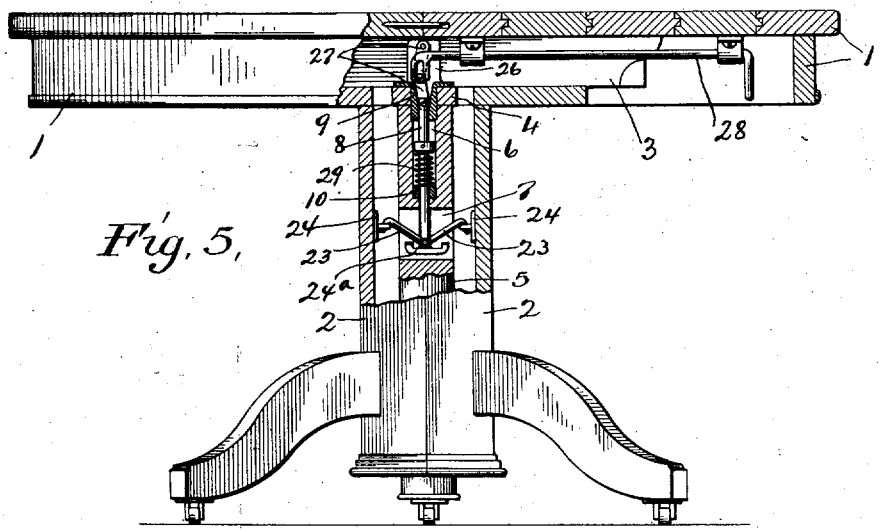
Figure 6:
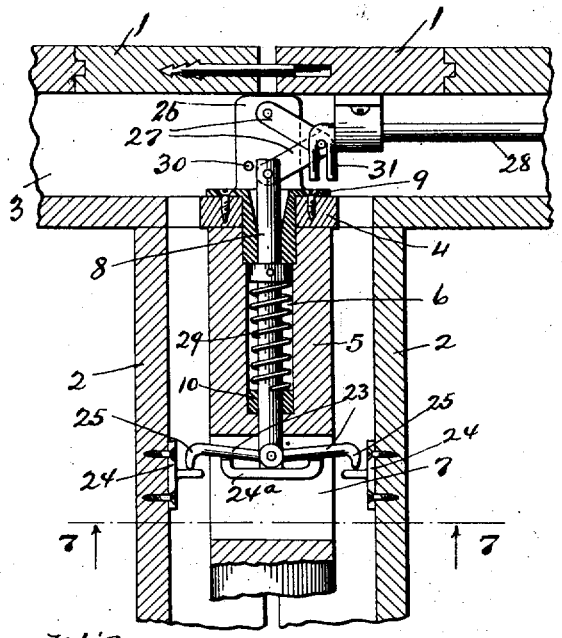
Figure 7:
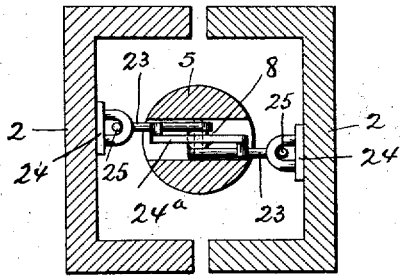

In the drawings, Figure 1 is a partial sectional side elevation of a pedestal extension-table having my improved locking device, section being made at a vertical plane through the pedestal parts and axially with respect to the center leg therein. Fig. 2 is a detail section axially with respect to the pedestal, showing the operating parts in a different position from Fig. 1. Fig. 3 is a section at the line 3 3 on Fig. 2. Fig. 4 is an elevation at the upper end of the operating-rod. Fig. 5 is a view similar to Fig. 1, showing a modified construction. Fig. 6 is a view similar to Fig. 2, relating to the construction shown in Fig. 5. Fig. 7 is a section at the line 7 7 on Fig. 6.

1 1 are the two parts of the table-top. 2 2 are the pedestal parts pertaining to them, respectively.

3 is one of the slides on which the bridge 4 is attached for carrying the center leg 5.

6 is an aperture formed axially in the center leg and through the bridge.

7 is a transaxial aperture through the leg, crossing the axial aperture at the lower end of the latter.

8 is a reciprocating rod or shaft extending in the aperture 6. Guide-bearings may be provided for this shaft in any convenient manner, as by a bearing-plate 9, mounted on the top of the bridge, and a bearing-bushing 10, forced into the axial aperture 6 of the center leg at a little distance above the transaxial aperture 7. At the upper end the shaft 8 is provided with a cross-head 11, having a slot 12, and on the table-top there is mounted a rock-shaft 14, which has at the inner end a crank terminating in a wrist 13, projecting parallel with said rock-shaft and adapted to enter the slot 12 in the cross-head of the shaft 8, the other end of said rock-shaft 14 being provided with a handle near the edge of the table in position to be conveniently reached, although out of sight, and by which the shaft may be rocked after the wrist 13 in the closing-up movement of the table has entered the slot 12, whereby the shaft 8 may be operated vertically to operate the devices hereinafter described at the lower end of the shaft for drawing and locking the pedestal members together. At the lower end of the shaft 8 in the form shown in Fig. 1 there are connected by the same pivot two links 15 15. These links trend downward and apart from their pivot to the shaft, being stopped at the position shown in Fig. 1 by a lug 16 on each link encountering the side of the shaft.

On the inner face of each of the pedestal parts opposite the parting plane there is mounted a bracket 17, said brackets each extending toward the opposite pedestal part and being of such length that they extend past each other when the pedestal parts are closed together, being sufficiently out of line to stand side by side at their lapping portions, each bracket having a lug 18 projecting from its lower edge in position to extend under the other bracket when the two are thus lapped by each other in the closed position of the pedestal, whereby they support each other. The outer end of each bracket may be sloped, as seen at 19, to prevent the collision with the lug of opposite bracket and cause each bracket to ride up onto the lug. Each of the brackets has at the outer end an upturned hook 20, forming a pivot-seat. The links 15 15 terminate in pivot bosses or studs 21 21, which are adapted to the seat in said pivot-seats. The transaxial aperture in the center leg is in proper position and of suitable extent in both dimensions to permit the brackets 17 17 to pass through it when the pedestal parts are closed together, and when they are as nearly together as they may stand when the top of the table is closed the operator by depressing or letting down the reciprocating shaft 8 causes the two links 15 15 to pass between the hooks 20 and their pivot-bosses 21 to strike the upper edge of the brackets, so that upon further depression the links are spread outward, the pivot-bosses traveling along the upper edge of the brackets the distance necessary to bring the bosses into the pivot-seats formed by the hooks 20 20. Further depression of the shaft causes the hooks or pivot-seats of the brackets to be forced in opposite directions and the pedestal parts to be drawn together. The proportions of the several parts are such that by the time the pedestal parts are fully closed up the pivot of the shaft is slightly above the line connecting the centers of the pivot-bosses 21 21, and as it is forced down to and past that line the elastic compression and extension of all the parts concerned operates to prevent the return, and so locks the parts in that position, the lug 16 on each link stopping on the upper edge of the other links, where they lap by each other, a notch being made, if necessary, in the brackets where they lap by each other to permit the shaft to pass low enough to produce the locking effect described.

In the form of my invention shown in Figs. 5, 6, and 7 instead of the links 15 15 trending downward and apart I provide links 23 23, which are stopped by a cross-arm 24ª on the end of the shaft under them when they reach a horizontal position, to which they tend by gravity. Instead of the brackets 17 17 I provide brackets 24 24, which are substantially in the form of staples shaped to be engaged by the hooked ends 25 25 to the links 23 23. For operating the shaft vertically I provide a bracket 26, projecting upward from the bearing-plate on top of the bridge, and two links 27 27, pivoted together, one of them being pivoted to the upper end of the bracket and the other to the upper end of the shaft, a thrust-bar or operating-handle 28 being connected to them at their pivot. A spring 29 is provided coiled about the shaft within the center leg, reacting between the bottom of the cavity provided for it and a suitable stop provided on the shaft to uphold the latter in such a position that the hooks of the lugs 23 may pass freely over the staple-brackets 24 without engaging them. When the shaft is at its upper position, the links 27 27 are folded, as seen in Fig. 5 in full line. By thrusting the bar 28 inward the operator will straighten the links and force downward the shaft 8, with the effect, first, to cause the hooks on the ends of the links 23 to engage behind the staples, and the shaft being further depressed the links 23 will fold upward from their pivot, and the distance between the hooks being thereby shortened the pedestal parts will be drawn together.

The parts may be so proportioned that the pedestal will be closed up just before the pivot of the links 27 27 reaches the line connecting the remote pivots of said links to each other—that is, to the bracket and to the shaft, respectively—and as the movement is continued, forcing the pivot past that line, the elastic reaction of all the parts will tend to prevent the return, and a stop 30 being provided on the bracket in position to check the movement just after the line is passed by the pivot the parts will be held locked. The operator will release them by pulling back the operating-rod, with the effect, first, to allow the pedestal parts to sag apart at the bottom and the links 23 to become slack; next, the links 23 23, reaching a horizontal position, will be picked up bodily by the cross-arm 24ª and carried up out of reach of the staples, so that the table may be extended. In order to permit the rod 28 to be disengaged from the pivot on the links 27 when the table is extended and to be reëngaged for the purpose of operating the links when it is closed up, such rod is provided with a fork 31, jutting off at right angles to the rod, and the latter is adapted to be rocked in its bearings on the table to throw the fork over to engage the pivot when the fork is depending and to throw it up to horizontal position for disengagement.

I claim—

1. In a pedestal extension-table, in combination with the separable parts and the pedestal parts pertaining thereto, respectively, an element mounted so as to be inclosed in the pedestal and to reciprocate vertically; a pair of links pivoted to said element; brackets on the pedestal parts at a substantial distance below the table-top in position to be encountered by the free ends of the links when the reciprocating element is moved endwise, whereby said ends after such encounter are limited to lateral movement, each bracket having means for engaging the encountering link whose lateral movement is toward the opposite pedestal part, to check such lateral movement, and means for giving endwise movement to the reciprocating element.

2. In a pedestal extension-table in combination with the separable parts and pedestal parts pertaining thereto, respectively, an element mounted on the center leg and adapted to reciprocate vertically; a pair of links pivoted to said element; brackets on the pedestal parts at a substantial distance below the table-top in position to be encountered by free ends of the links when the reciprocating element is moved endwise; whereby said ends after such encounter are limited to lateral movement; each bracket having means for engaging the encountering link whose lateral movement is toward the opposite pedestal part, to check such lateral movement, and means for giving endwise movement to the reciprocating element.

3. In a pedestal extension-table, in combination with the separable parts and the pedestal parts pertaining thereto, respectively; an element mounted so as to be inclosed by the pedestal adapted to reciprocate vertically; a spring tending to uphold it and a means for depressing it against the spring; a pair of links pivoted to said element; brackets on the pedestal parts respectively at a substantial distance below the table-top in position to be encountered by the free ends of said links when the reciprocating element is depressed and to guide said ends laterally; each bracket having means for stopping the lateral movement of the link whose said movement is toward the opposite pedestal part; whereby continued depression of the reciprocating element draws the pedestal parts together.

4. In a pedestal extension-table, in combination with the slide connecting-bridge, the separable parts and the pedestal parts pertaining thereto respectively; an element carried by the slide connecting-bridge mounted so as to reciprocate vertically; a pair of links pivoted to the lower part of said element; brackets on the pedestal parts, respectively, at a substantial distance below the table-top in position to be encountered by the free ends of said links in the endwise reciprocation of the reciprocating element and to guide said ends laterally after such encounter; means by which the brackets, respectively, in such lateral movement of the links become engaged each with the link whose movement is toward the opposite pedestal part, and means mounted upon the slide connecting-bridge for giving endwise movement to the reciprocating element.

5. In a pedestal extension-table, in combination with the separable parts and the pedestal parts pertaining thereto respectively, an element mounted on the center leg and adapted to reciprocate vertically; a pair of links pivoted on said element and adapted to extend off therefrom in opposite directions; stops by which the links are checked at substantially horizontal position while left free to swing upward from such position; brackets on the pedestal parts respectively at a substantial distance below the table-top in position to be encountered by the free ends of the links when the reciprocating element is depressed, whereby said ends after such encounter are limited to lateral movement, the links having hooked ends for engaging such brackets when they encounter them, whereby the further descent of the reciprocating element draws the pedestal members together; and means for locking the reciprocating element at its depressed position when the pedestal members are closed.

6. In a pedestal extension-table, in combination with the upper structure consisting of the separable parts of the table and the extension devices which connect them, the pedestal parts pertaining to said separable table parts, respectively; devices for releasably connecting and disconnecting pedestal parts at a substantial distance below the table-top; means for operating such devices, comprising a thrust-rod connected thereto at its lower end; a pair of links connected together and connecting the upper end of said thrust-rod to the upper structure; means operating on the links to fold and straighten them, the links being free to fold in one direction, and a stop to arrest their folding in the other direction just beyond their straightened position.

7. In a pedestal extension-table, in combination with the separable parts, the extension-slides connecting them, and the pedestal parts pertaining to the said separable table parts, respectively; devices carried by the extension-slides for releasably connecting and disconnecting the pedestal members at a substantial distance below the table-top; a means for operating said devices comprising a vertically-movable rod connected therewith at its lower end; pivot carried by the extension-slides; a pair of links connecting the upper end of the rod to such pivot, the links being free to fold in one direction and a stop to arrest their folding in the opposite direction just beyond their straightened position; and means operating on the links to fold and straighten them.

8. In a pedestal extension-table, in combination with the separable members, the extension-slides connecting them and the pedestal members pertaining to said separable members, respectively; devices carried by the extension-slides for releasably connecting and disconnecting the pedestal members at a substantial distance below the table-top; a means for operating said devices comprising a vertically-movable rod connected therewith at its lower end; a pivot carried by the extension-slides; a pair of links connecting the upper end of the rod with such pivot, said links being free to fold in one direction, a stop to arrest their folding in the opposite direction just beyond their straightened position, and an operating-rod mounted on a table member at the side toward which the links fold without restraint, said rod having a slot adapted to engage the pivot which connects the links, and being mounted so as to be rocked in its bearings to effect engagement and disengagement of the slot with the pivot; whereby the longitudinal operation of the rod folds and straightens the links to effect the locking and unlocking of the device.

9. In a pedestal extension-table, in combination with an upper structure consisting of the separable members and extension devices connecting them, the pedestal members pertaining to said separable members, respectively; devices carried by the upper structure for releasably connecting and disconnecting the pedestal members at a substantial distance below the table-top; means for operating said devices comprising a vertically-movable rod connected therewith at its lower end; a spring tending to uphold the rod, and devices carried by the upper structure operating on the upper end of the rod for depressing the rod and locking it in depressed position against the action of the spring, and means for unlocking it to permit the spring to lift the rod.

10. In a pedestal extension-table in combination with an upper structure consisting of the separable members of the table and the extension-slides which connect them; the pedestal members pertaining to said separable members, respectively; devices for releasably connecting and disconnecting the pedestal members at a substantial distance below the table-top; a means for operating such devices comprising a thrust-rod connected therewith at its lower end; a spring tending to uphold the thrust-rod; a pair of links connected together and connecting the upper end of the rod with the upper structure; a means operating on the links to fold and straighten them, the links being free to fold in one direction and a stop to arrest their folding in the other direction just beyond their straightened position.

11. In a pedestal extension-table, in combination with the separable parts and pedestal parts pertaining thereto respectively; an element mounted so as to be inclosed in the pedestal and to reciprocate vertically; a pair of links pivoted to the said element at the lower part; brackets on the pedestal parts, respectively, at a substantial distance below the table-top arranged to be encountered by the free ends of the links in the endwise movement of the reciprocating element and to guide them laterally after such encounter, said brackets being provided with means for becoming engaged each with the link whose said movement is toward the opposite pedestal part; a pair of links pivoted together, one of them being pivoted to the reciprocating element and the other to a pivot fixed with respect to the support of said reciprocating element substantially in line therewith; a spring to uphold the reciprocating element and fold the links, and means extending under the table-top for forcing the pivot at which the links are connected together toward the line of the other pivot of said links, to depress the reciprocating element against the action of its spring.

12. In a pedestal extension-table, in combination with the separable parts and pedestal parts pertaining thereto respectively, an element mounted so as to be inclosed in the pedestal and to reciprocate vertically; a pair of links pivoted to the said element at the lower part, brackets on the pedestal parts respectively, at a substantial distance below the table-top, arranged to be encountered by the free ends of the links in the endwise movement of the reciprocating element and to guide them laterally after such encounter, said brackets being provided with the means for becoming engaged each with the link whose said movement is toward the opposite pedestal part; a pair of links pivoted together, one of them being pivoted to the reciprocating element and the other to a pivot fixed with respect to the support of said reciprocating element substantially in line therewith; a spring to uphold the reciprocating element and fold the links, and means extending under the table-top for forcing the pivot at which the links are connected together past the line of the other pivots of the links and a stop to arrest such movement when said line is passed by said pivot.

13. In a pedestal extension-table, in combination with the separable parts and pedestal parts pertaining thereto, respectively, an element mounted so as to be inclosed in the pedestal and to reciprocate vertically; a pair of links pivoted to the said element at the lower part; brackets on the pedestal parts, respectively, at a substantial distance below the table-top arranged to be encountered by the free ends of the links in the endwise movement of the reciprocating element and to guide them laterally after such encounter, said brackets being provided with means for becoming engaged each with the link whose said movement is toward the opposite pedestal part; a pair of links pivoted together, one of them being pivoted to the reciprocating element and the other to a pivot fixed with respect to the support of said reciprocating element substantially in line therewith; a spring to uphold the reciprocating element and fold the links; a rod mounted under the table above the bridge adapted to be reciprocated endwise to force the joint or pivot of the links to each other toward the line of the other two pivots of said links.

14. In a pedestal extension-table, in combination with the separable parts and pedestal parts pertaining thereto, respectively, an element mounted so as to be inclosed in the pedestal and to reciprocate vertically; a pair of links pivoted to the said element at the lower part; brackets on the pedestal parts respectively at a substantial distance below the table-top arranged to be encountered by the free ends of the links in the endwise movement of the reciprocating element and to guide them laterally after such encounter; said brackets being provided with means for becoming engaged each with the link whose said movement is toward the opposite pedestal part; a pair of links pivoted together one of them being pivoted to the reciprocating element and the other to a pivot fixed with respect to the support of said reciprocating element substantially in line therewith; a spring to uphold the reciprocating element and fold the links, and a shaft or rod mounted on one part of the table, adapted to be reciprocated in its bearings, having a lateral fork for engaging the joints or pivots of the two links to each other and adapted to be rocked in its bearings to engage and disengage the fork.

15. In a pedestal extension-table, in combination with the separable members of the table, the extension devices which connect said separable members and the pedestal members pertaining to the latter respectively; means carried by the extension devices for connecting the pedestal members at a substantial distance from both top and bottom, and means at the top for operating the same; means mounted on one member of the table extending from a point near the margin thereof toward the parting plane, and adapted to be operatively engaged with said operating means when the table members are nearly closed together, and to be disengaged when the table is extended.

16. In a pedestal extension-table, in combination with the separable members, the extension devices connecting them and the pedestal members pertaining to them respectively; connections for drawing and locking together the pedestal members at a substantial distance from both top and bottom, and means mounted on the center leg and extending from said connections to one end of the pedestal for operating the same.

In testimony whereof I have hereunto set my hand, in the presence of two witnesses, at Chicago, Illinois, this 26th day of November, 1902.

EMIL TYDEN.

In presence of—
CHAS. S. BURTON,
FRED G. FISCHER.